J. S. WORTH.
PROCESS OF DISHING METALLIC PLATES.
APPLICATION FILED MAY 20, 1908.
1,061,797.
Patented May 13, 1913.
2 SHEETS—SHEET 1.
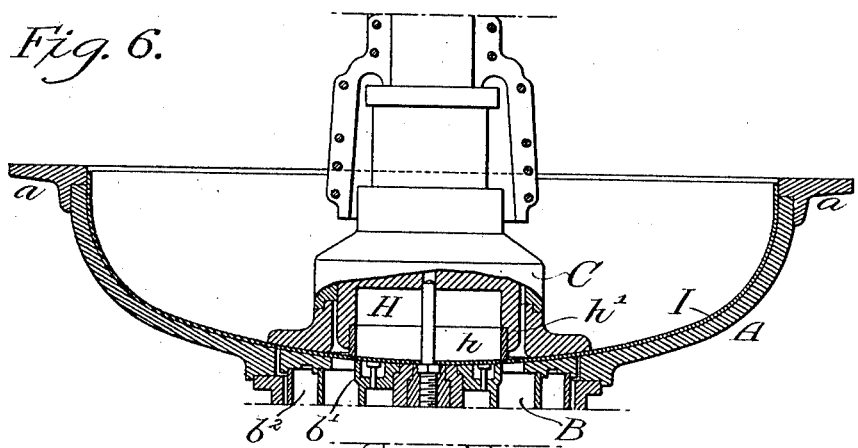
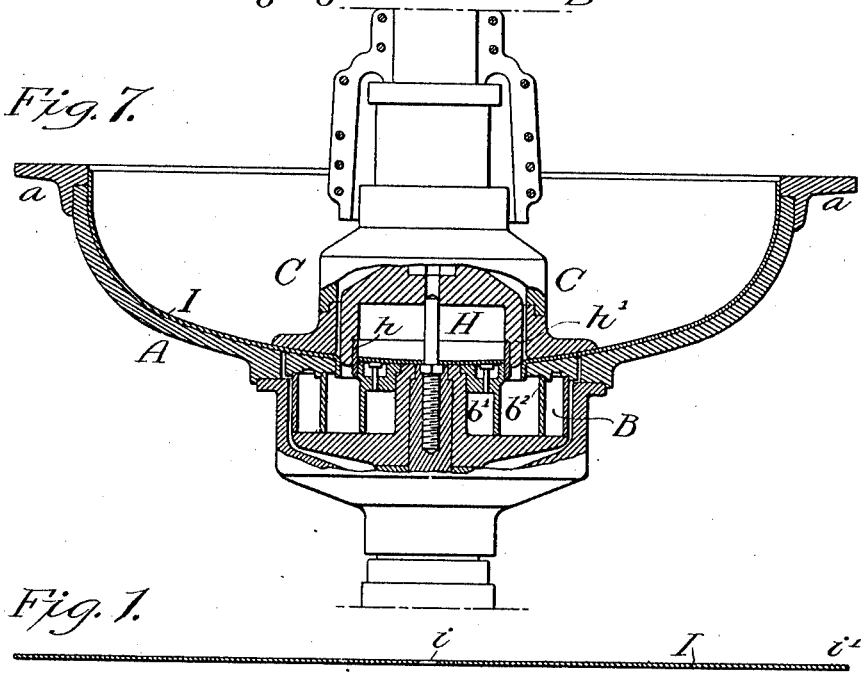
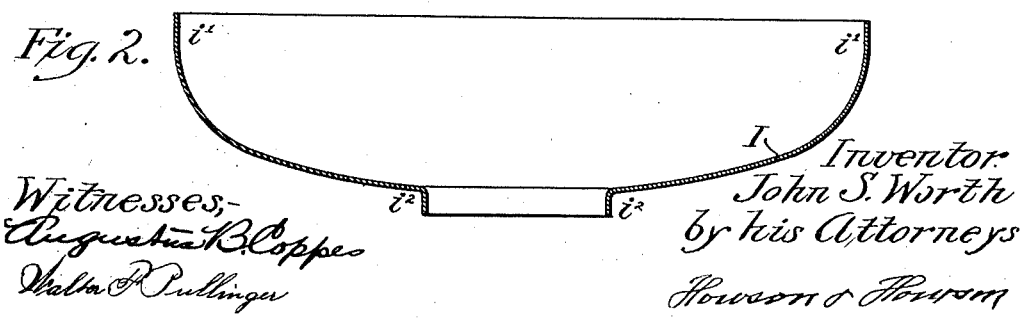
Witnesses,—
Inventor:
John S. Worth
by his Attorneys

J. S. WORTH.
PROCESS OF DISHING METALLIC PLATES.
APPLICATION FILED MAY 20, 1908.

1,061,797.

Patented May 13, 1913.

2 SHEETS—SHEET 2.

Witnesses,
Walter R. Pullinger
Augustus B. Coppes

Inventor,
John S. Worth
by his Attorneys
Howson & Howson

UNITED STATES PATENT OFFICE.

JOHN S. WORTH, OF COATESVILLE, PENNSYLVANIA, ASSIGNOR OF ONE-HALF TO WILLIAM P. WORTH, OF COATESVILLE, PENNSYLVANIA.

PROCESS OF DISHING METALLIC PLATES.

1,061,797.  Specification of Letters Patent.  Patented May 13, 1913.

Application filed May 20, 1908. Serial No. 433,866.

*To all whom it may concern:*

Be it konwn that I, JOHN S. WORTH, a citizen of the United States, residing in Coatesville, Pennsylvania, have invented certain Improvements in the Process of Dishing Metallic Plates, of which the following is a specification.

My invention relates to certain improvements in the process of making a deep dish in a metallic plate.

The object of my invention is to dish a plate in such a manner that it will be gradually reduced practically to an even thickness throughout and the edges of the dished plate will not buckle.

My invention is particularly adapted for dishing very heavy steel plates and forming a very deep dish in the plate.

Figure 3:
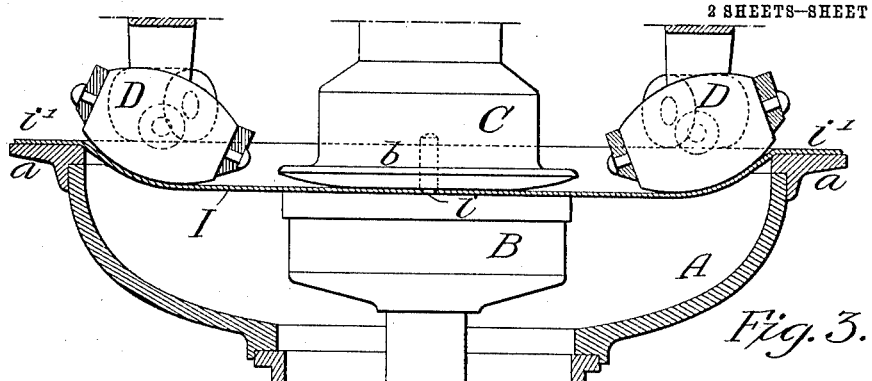
Figure 4:
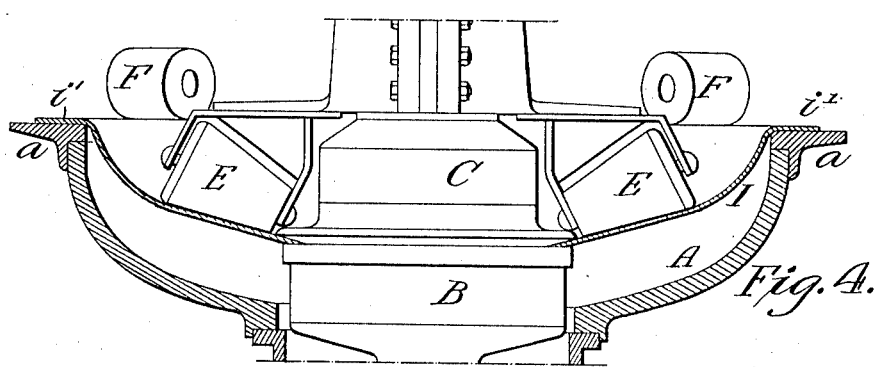
Figure 5:
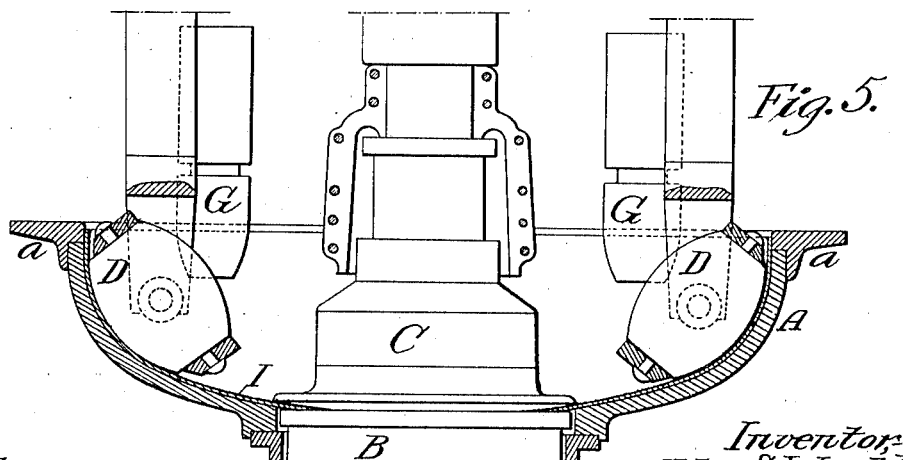

In the accompanying drawings:—Figure 1, is a sectional view of a flat plate which is cut in the form of a disk and, in this case, having a small hole in the center; Fig. 2, is a sectional view showing the plate after the dishing has been completed, a hole cut in the center of the plate and the plate flanged around the hole; Figs. 3, 4 and 5, are views showing different steps in the dishing process; Fig. 6, is a view showing the method of cutting a hole in the center of the plate; and Fig. 7, is a view showing the method of flanging the plate around the hole.

Referring in the first instance to Figs. 3, 4 and 5, A is a former of the shape to which the plate is to be dished, B is a head adapted to extend through the former, as shown in Fig. 3, and C is a head arranged to press the plate upon the head B, and one of these heads has, in this case, a pin $b$ adapted to a central opening $i$ in the plate I.

D, D are rollers adapted to be raised and lowered and mounted on swivel bearings; each of these rollers has a curved face which conforms to the curve of the former, as illustrated in Fig. 5. The rollers press upon the plate near the periphery of the former A.

E, E are rollers pressing upon the plate between the head C and the rollers D.

F, F are rollers for pressing the edge $i''$ of the plate down upon the flange $a$ of the former, and G, G are vertically arranged rollers for forcing the edges of the plate against the inner upper edge of the former and preventing the edges of the plate from buckling.

The particular arrangement of rollers and the mechanism for operating them is fully covered in a separate application for patent for my improved machine filed on the 20th day of May 1908, under Serial Number 433,865.

The present application relates particularly to the process of handling the rolls so as to produce a dished plate which is free of buckles and which is so drawn that it will be practically of an even thickness throughout.

Referring to Figs. 6 and 7, in the head C is a cutter head H having an annular knife $h$ and in the head B is a ring $b'$ which acts in conjunction with the knife $h$, when the head is forced down, to cut a hole in the plate after it has been dished. As the head H is further depressed its edge $h'$ forces the overhanging portion of the plate over the edge of the outer ring $b^2$, turning down this edge and forming a flange, as clearly indicated in Fig. 7. This mechanism is also described and claimed in the application above referred to.

My process is carried out in the following manner:—The plate is circular with a hole punched in the center, in the present instance, as shown in Fig. 1. It is then placed in a suitable heating furnace and heated to the proper degree, after which it is removed from the furnace and placed on the former A and between the clamping heads B and C, the pin $b$ projecting through the central hole in the plate. Rotary motion is then imparted to the former and clamps and the two rolls D, D are forced down upon the plate, forming the initial dish in the plate, while at the same time the clamps are being lowered to help pull the plate downward, as illustrated in Fig. 3. As the dish is formed in the plate the rolls F, F hold the edge of the plate down upon the rim $a$ of the former so as to prevent the buckling of the edges of the plate as the plate is drawn by the action of the rolls D, D and the clamps. After the plate has been dished to a certain extent, if found too cold to finish at one heat it is then taken from the machine and reheated. After the plate is reheated to the proper degree and placed in the machine again then the process is continued, the plate being forced farther into the dished form and finally the rolls E, E also act upon the plate nearer the center, as well as the head C, pressing the plate tightly against the former, as illustrated in Fig. 4. This rolling operation is continued until the plate is completely dished, as illustrated in Fig. 5. During the final dishing operation the vertically arranged rollers G, G press the plate against the inner periphery of the former A so as to prevent any wrinkles tending to form by buckling. As the plate I is drawn into the former by the rolls E and D, the edges of the plate will be drawn from under the rolls F, although in some instances the plate may be of such a size or drawn to such an extent that a portion of the plate will remain in position over the flange, as this shape is frequently desired in the finished head.

While the pressure of the rolls D and E is practically continuous, the rolls F and G will only act when there is the least sign of a buckle. When the operator notices the plate commencing to buckle at the edges then one of the series of rolls F or G is brought to act upon the plate to press out the buckle, so that the plate will have a true circular edge, as illustrated in Fig. 2.

If it is desired to perforate and flange the plate then the process is carried still further by forcing the cutter head H down upon the plate so as to cut a circular piece out of the plate after it is dished and while it remains in the former, as illustrated in Fig. 6, and if it is desired to flange the plate around the opening the movement of the cutter is continued until it presses upon the overhung portion of the plate, turning it down to form a flange $i^2$, as illustrated in Fig. 2.

Thus it will be seen that by the above described process I can make a perfectly dished plate of deep form and of an enlarged size and of heavy metal and, if necessary, can form an opening in the plate and flange the plate around the opening, the edges of the plate being perfect and free from buckles.

The small hole in the center is not necessary, but is used, where not objectionable, for centering the plate in the machine. Other means can be used for this purpose as shown in my application for patent for the improved machine above referred to.

I claim:—

1. The process herein described of dishing metal plates, said process consisting in heating a plate, making a primary dish therein near the periphery while the periphery and center are positively held; depressing the center of the plate as the dishing proceeds; rolling the plate between the periphery and center to increase the dish; and rolling the plate at the edge while still held at the center.

2. The process herein described of dishing metal plates, said process consisting in heating a plate, making a primary dish therein near the periphery while the periphery and center are positively held; depressing the center of the plate as the dishing proceeds: rolling the plate between the periphery and center to increase the dish; rolling the plate at the edge while still held at the center: then cutting a hole in the plate while the plate is held; and forming a flange on the plate surrounding the hole.

In testimony whereof, I have signed my name to this specification, in the presence of two subscribing witnesses.

JOHN S. WORTH.

Witnesses:
 Jos. H. Klein,
 Wm. A. Barr.